United States Patent
Isbell

[15] 3,691,921
[45] Sept. 19, 1972

[54] MICROFILM MAGAZINE

[72] Inventor: Willard D. Isbell, San Diego, Calif.

[73] Assignee: Cubic Corporation, San Diego, Calif.

[22] Filed: June 11, 1970

[21] Appl. No.: 45,304

[52] U.S. Cl. .................. 95/31, 242/197, 242/71.1
[51] Int. Cl. .................................. G03b 17/26
[58] Field of Search ............ 242/71.1, 71.7, 198, 199;
352/75, 76, 78; 206/52 F; 95/31

[56] References Cited

UNITED STATES PATENTS

| | | | |
|---|---|---|---|
| 1,087,996 | 2/1914 | Tessier | 352/76 |
| 1,081,926 | 12/1913 | Dietze | 242/198 |
| 2,844,991 | 7/1958 | Badgley | 242/71.1 X |
| 3,090,574 | 5/1963 | Doncaster et al. | 242/71.1 X |

*Primary Examiner*—Stanley N. Gilreath
*Assistant Examiner*—Gregory A. Walters
*Attorney*—Carl R. Brown

[57] ABSTRACT

A microfilm magazine having a light tight cover with a single central fastening which has controlled pressure means, the fastening being secured to and stabilizing the film supporting shaft. The film passes through a short minimum contact path and leaves the magazine through an opening fitted with a normally closed light tight door, which opens automatically when the magazine is inserted in a camera. The door and the film footage follower arm are latched clear of the film for loading, the latches being automatically released when the cover is applied. A constant load clutch controls the film reel rotation and the drive means is biased to permit safe assembly into a camera when the drive gears are misaligned.

12 Claims, 9 Drawing Figures

PATENTED SEP 19 1972 3,691,921
SHEET 1 OF 3
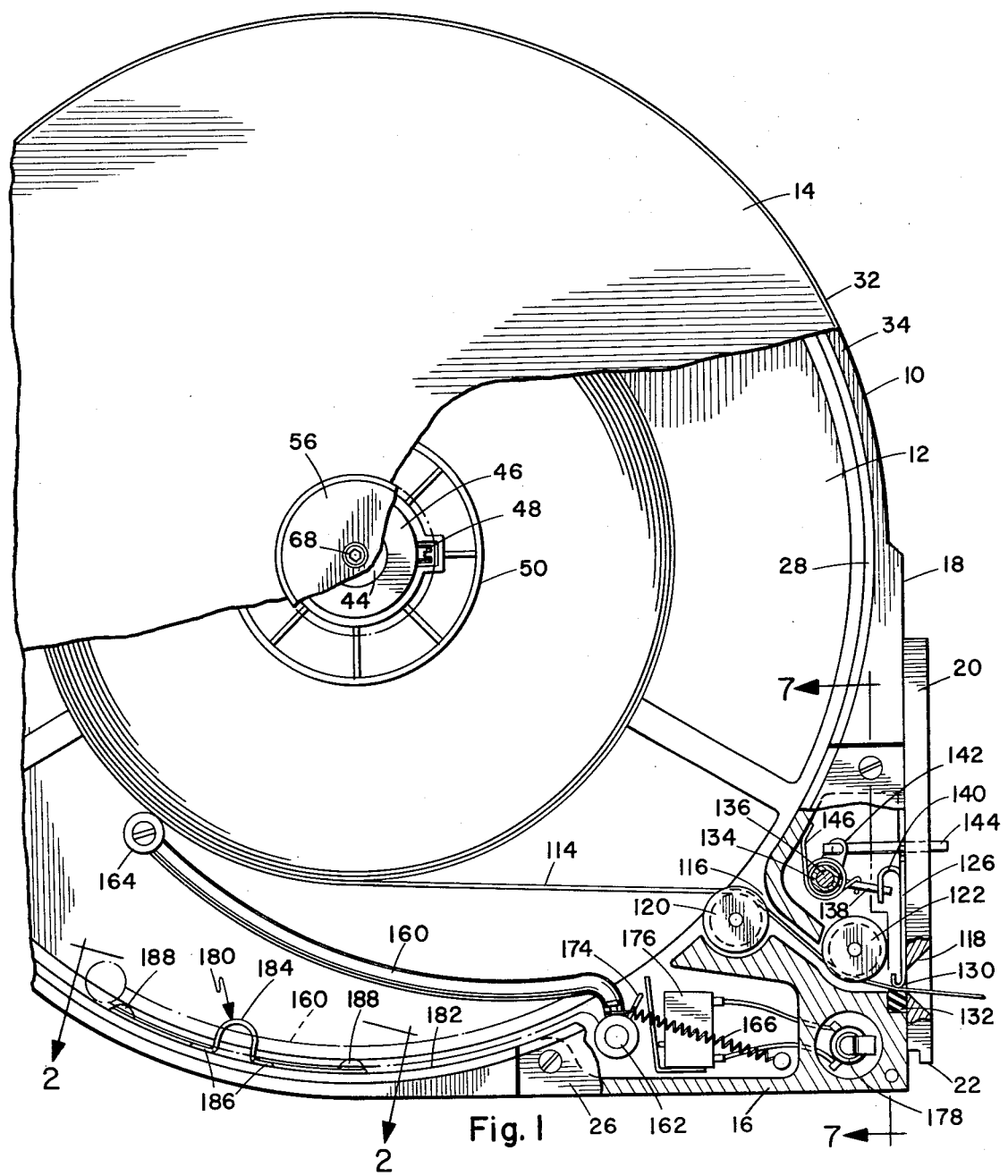
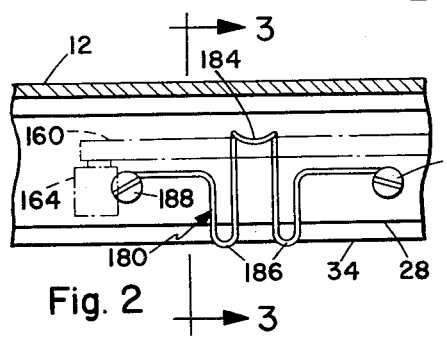
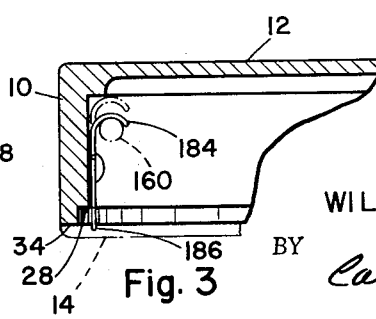
INVENTOR.
WILLARD D. ISBELL
BY Carl R. Brown
ATTORNEY

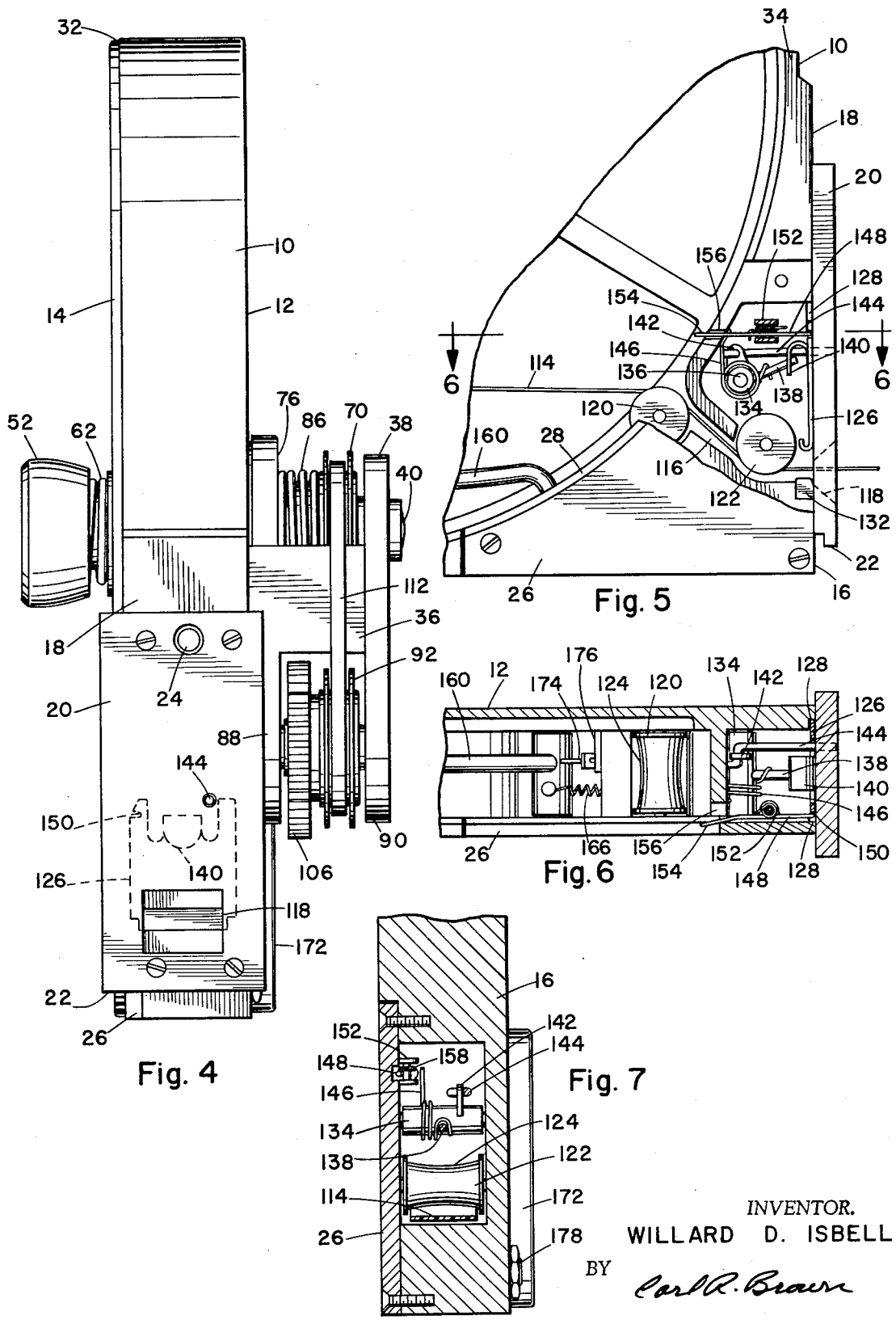

INVENTOR.
WILLARD D. ISBELL
BY
Carl R. Brown
ATTORNEY

MICROFILM MAGAZINE

BACKGROUND OF THE INVENTION

In magazines for unexposed film, light leakage is a major problem, particularly with highly sensitive film. Magazine covers are usually held by several clamps around the rim, but uneven clamping can cause warping of the cover and multiple clamps are difficult to fasten properly when loading film in a darkroom. The film is usually led out of the magazine through a labyrinth of rollers to prevent light leakage, and there is a problem of damage to the film from the considerable contact with rollers. When loading the magazine into a camera, the drive gears must be properly aligned to avoid damage, and some complex bearings have been devised to compensate for this. Another problem is loosening of film in the magazine due to over-running, particularly when the feed is intermittent and jerky.

SUMMARY OF THE INVENTION

The magazine described herein is interchangeable with certain types of existing magazines and incorporates features which overcome or avoid the above mentioned problems. The cover is held by a single large clamp knob at the center, which has controllable clamping pressure and is secured to the shaft on which the film reel rotates, so acting as a stabilizer for the shaft. Drive means for the film reel includes a constant torque clutch to prevent over-running, and the drive gear has a simple resilient and anti-backlash mounting to facilitate attachment to a camera when the gears are misaligned.

The film is guided by only two rollers, which are concave and contact the film only at the edges, and leaves the magazine through an opening which is closed by a light tight door. When the magazine is attached to a camera the door is automatically opened, and a latch is provided for holding the door open when loading the film.

The usual follower arm, which rides on the periphery of the film and actuates the film footage indicator, can be latched back while loading film, greatly simplifying the darkroom operation. When the cover is secured in place, the latches for the follower arm and the light tight door are automatically released, making the magazine ready for immediate use.

The primary object of this invention, therefore, is to provide a new and improved microfilm magazine.

Another object of this invention is to provide a microfilm magazine having a single clamp which secures the light tight cover and stabilizes the film reel mounting.

Another object of this invention is to provide a microfilm magazine in which the film follows a minimum contact path through an opening which is normally closed by a light tight door that opens automatically when the magazine is attached to a camera.

A further object of this invention is to provide a microfilm magazine having a constant torque clutch in a drive means which will accommodate misalignment of gears when attached to a camera.

Another object of this invention is to provide a microfilm magazine in which elements which would interfere with loading of the film are latched back for loading and unlatch automatically when the cover is secured in place.

Other objects and many advantages of this invention will become more apparent upon a reading of the following detailed description and an examination of the drawings, wherein like reference numerals designate like parts throughout and in which:

BRIEF DESCRIPTION OF THE DRAWINGS

FIG. 1 is a side elevation view of the magazine with portions cut away.

FIG. 2 is a sectional view taken on line 2—2 of FIG. 1.

FIG. 3 is a sectional view taken on line 3—3 of FIG. 2.

FIG. 4 is an end view of the magazine, as taken from the right hand side of FIG. 1.

FIG. 5 is a partial side elevation view with a portion of the cover plate cut away to show the light tight door mechanism.

FIG. 6 is a sectional view taken on line 6—6 of FIG. 5.

FIG. 7 is a sectional view taken on line 7—7 of FIG. 1.

DESCRIPTION OF THE PREFERRED EMBODIMENT

Figure 8:
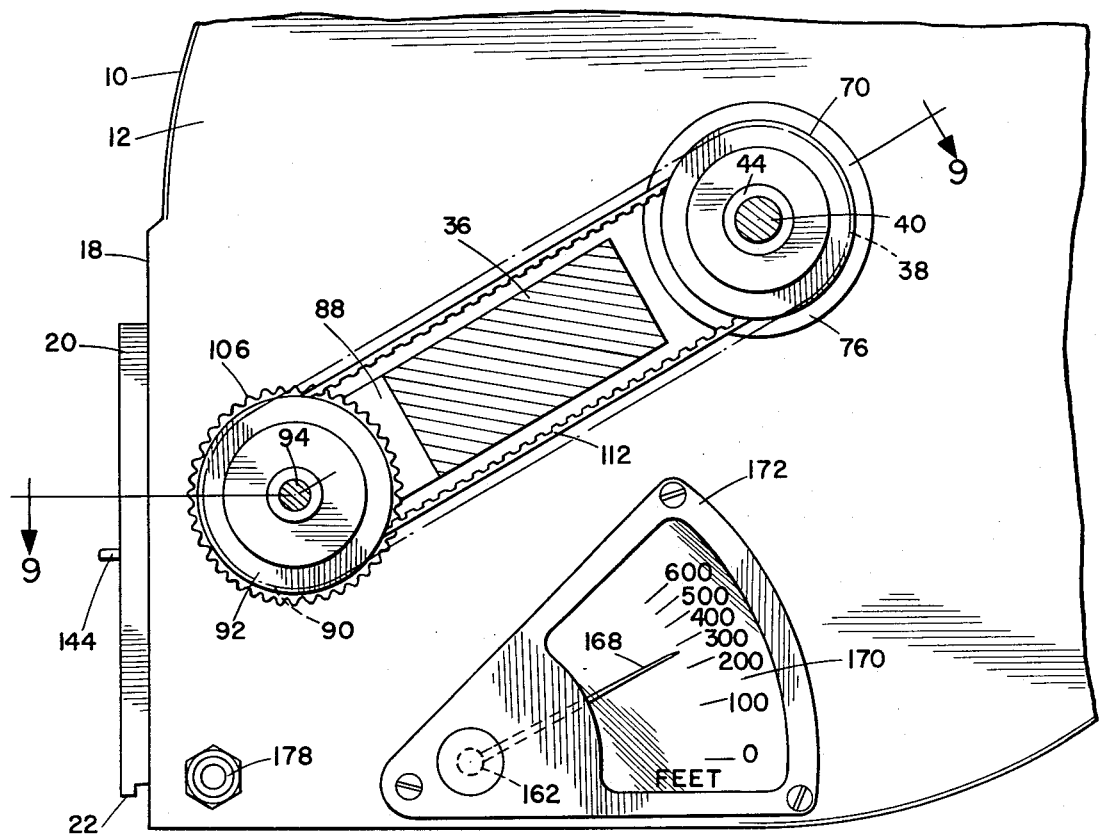
FIG. 8 is a side elevation view of the other side of the magazine.

The magazine comprises a flat, substantially cylindrical casing 10 with a closed side 12 and a full diameter removable cover 14 enclosing the other side. A portion of the periphery of casing 10 is extended into a right angled corner block 16 having a flat end face 18, on which is secured a mounting plate 20 for attachment to the retaining fittings of the camera. Various types of mountings are used, the plate shown having a flange 22 at one end and a threaded socket 24 at the other, which is one standard arrangement. Corner block 16 contains the mechanism associated with the magazine and, on the open side, has a flush cover plate 26 enclosing the mechanism. The inner periphery of the casing 10 has an inset shoulder 28, continuing through the inner edge portion of cover plate 26, the inner face of cover 14 having a peripheral rib 30 which seats on shoulder 28. The edge of cover 14 extends beyond rib 30, forming a flange 32 which seats on the open side rim 34 of casing 10, the flange and inset rib making a light trap.

On the outside of closed side 12 is a mounting block 36 having an extended tongue 38 at one end, spaced from the closed side. Fixed in tongue 38 is a shaft 40 which projects axially through closed side 12 and has a threaded end 42 adjacent cover 14. Rotatably mounted on shaft 40 is a bearing sleeve 44, to which a film reel hub 46 is secured by a set screw 48. The set screw projects from hub 46 and acts as a driving key in a standard film reel 50, as in FIG. 1.

Figure 9:
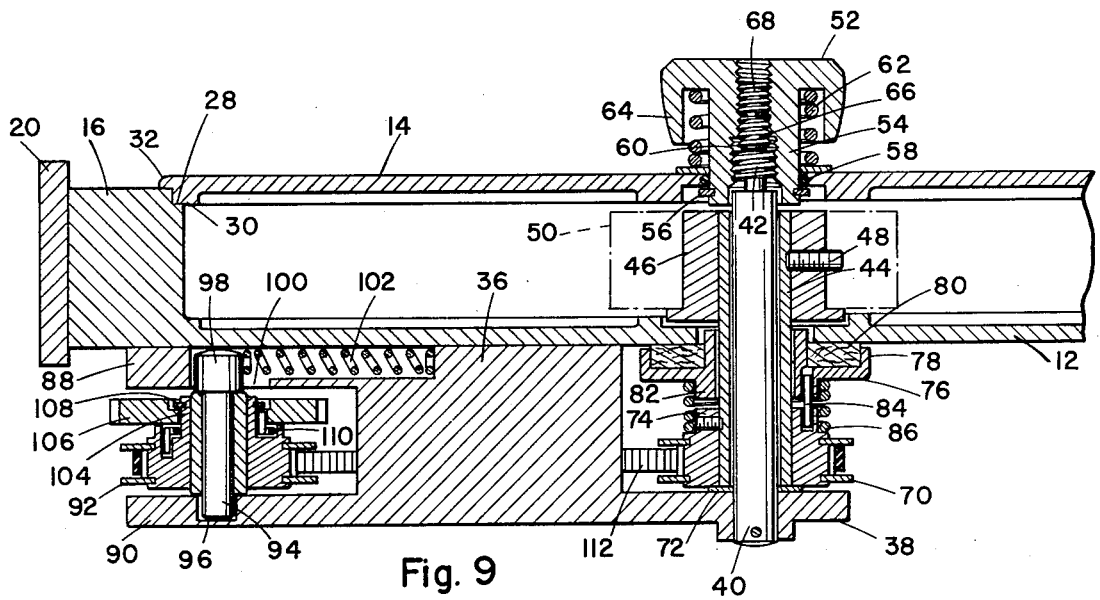
FIG. 9 is a sectional view taken on line 9—9 of FIG. 8.

Mounted in the center of cover 14 is a clamp knob 52, having an axially extended boss 54 which passes through the cover and is held by a snap ring 56. An O-ring 58 is set into the cover to make a light tight seal around boss 54, which is internally threaded at 60 to screw on threaded end 42, as in FIG. 9. A load spring 62 is fitted around boss 54 between cover 14 and the knob, which has a peripheral skirt 64 substantially enclosing the spring. The cover holding pressure which can be applied by the spring is controlled by means of a set screw 66 axially adjustable in knob 52 and locked by a second set screw 68. Set screw 66 bears on the threaded end 42 and limits the amount by which the knob can be screwed on.

Secured to sleeve 44 adjacent tongue 38 is a pulley 70, bearing on a thrust washer 72, the pulley having a hub 74 extended toward closed side 12. Mounted on the sleeve is a clutch plate 76 having a peripheral flange 78 which holds a friction pad 80, of felt or the like, against closed side 12. Clutch plate 76 has a hub 82 opposed to hub 74 and is keyed to rotate with pulley 70 by a pin 84 joining the two hubs. A clutch spring 86 seated on hubs 74 and 82 provides the frictional bearing pressure on pad 80 to ensure a constant drag torque on the reel rotation.

At the other end of mounting block 36 is an inner tongue 88 against closed side 12, and an outer tongue in spaced parallel relation. The outer portion of the mounting block is cut away and indicated in broken line in FIG. 8, to show the drive means clearly. Between the inner and outer tongues is a pulley 92 rotatably mounted on a pin 94, which is seated in a socket 96 in outer tongue 90. At the other end of pin 94 is an enlarged head 98 which fits into an elongated slot 100 in the inner tongue 88, the head being biased radially outwardly from the magazine axis by a retaining spring 102 recessed in the inner tongue. Pulley 92 has an axially extended hub 104 on which is mounted a gear 106, held in place by a snap ring 108. An antibacklash torsion spring 110 is installed in hub 104 between gear 106 and pulley 92. Connecting the pulleys 92 and 70 is a toothed belt 112, so that rotation of gear 106 turns the hub 46.

The mounting block 36 is shown in an inclined position to put gear 106 at the proper location to mesh with the drive gear of a camera, not shown. If the gear teeth are not precisely aligned when the magazine is attached, spring 102 allows the gear 106 to move back and torsion spring 110 accommodates the rotation necessary to enable gear 106 to mesh.

The film 114 passes out of the magazine through a passage 116 in corner block 16 and through an outwardly divergent opening 118 in mounting plate 20. At opposite ends of passage 116, the film is supported by freely rotatable guide rollers 120 and 122, each of which has a concave face 124 so that the film is contacted only at the extreme edges. Opening 118 is normally closed by a light tight door 126 sliding against the rear face of mounting plate 20, the edges of the door riding in grooves 128 in corner block 16 and cover plate 26. The lower edge of door 126 has an inwardly rolled lip 130 which closes against a resilient sealing block 132 inset behind the lower edge of opening 118. Adjacent the door is a rocker sleeve 134 rotatably mounted on a post 136 fixed in the corner block, the rocker sleeve having a radially extending pin 138 which fits through a lug 140 on the rear of the door. Fixed on rocker sleeve 134 is an arm 142 from which a push rod 144 extends through mounting plate 20. A torsion spring 146 fitted around rocker sleeve 134 and engaging pin 138 and an adjacent portion of the corner block, biases the door 126 to closed position. In this position the push rod 144 projects from mounting plate 20, as in FIG. 1. When the push rod is pressed inwardly as when the magazine is mounted on a camera, the rocker sleeve rotates and pin 138 lifts the door to the open position, as in FIG. 5.

To facilitate loading the film in the magazine, door 126 may be latched open by means of a latch pin 148 which engages a notch 150 in an edge of the door, when the door is in open position. Latch pin 148 is pivotally mounted in brackets 152, which are shown on the cover plate 26 but could be incorporated in the corner block structure. The inner end 154 of latch pin 148 projects through a slot 156 into the shoulder portion 28 of the casing, so that the cover 14 presses down on the inner end and lifts the other end out of notch 150 to release the door. A spring 158 biases the latch pin into the notch when the cover is removed and the door is intentionally opened.

The amount of film in the magazine is measured by a follower arm 160 secured at one end to a hinge pin 162 which is pivotally mounted in corner block 16. At the other end of arm 160 is a freely rotatable roller 164, which rides on the outside of the rolled film and is held in light contact with the film by a spring 166 coupled to the hinged end of the arm. Hinge pin 162 extends through the closed side of the magazine and is connected to the pointer 168 of a footage indicator 170, which is enclosed in a housing 172 for protection. When the follower arm 160 is at the limit of its swing toward the center of the magazine, with little or no film remaining, a peg 174 on the hinge end of the arm actuates a microswitch 176. The switch is connected to a jack 178, into which a suitable signal means can be plugged to indicate the end of the film.

To clear a full reel of film, the follower arm 160 is made arcuate along its length to fit against the wall of casing 10, the configuration being well known. When loading the film the follower arm must be held back in this position to avoid damage to the film. To simplify the operation, a latch 180 is mounted on the inside face 182 of the casing to hold the follower arm. As shown, the latch 180 is formed from resilient wire and has a return folded hook portion 184 in which the follower arm is held, as in the broken line positions in FIGS. 1 and 2. On each side of hook portion 184 is a return folded prong 186 projecting outwardly beyond rim 34, the two ends of the wire element being held by screws 188. When the cover 14 is secured in place, the prongs 186 are depressed by the cover, pushing hook portion 184 clear of the follower arm 160, as in the broken line position in FIG. 3, and allowing the follower arm to engage the film.

To load the film in the magazine, the cover 14 is removed, follower arm 160 is engaged on latch 180 and push rod 144 is depressed to open door 126, which is held open by latch pin 148. In darkroom conditions the full reel 50 is placed on hub 46 and the end of film 114 is pushed through passage 116, until the end emerges from opening 118. With the very simple roller arrangement and almost straight through path, this is an easy operation. The operator's entire task is greatly simplified since various moving parts do not have to be held in place to clear the film. Cover 14 is then replaced, which releases latch 180 and latch pin 148, setting the footage indicator and closing the light tight door 126. Clamp knob 52 is screwed down to the limit determined by set screw 66, holding the cover securely with the correct pressure. The magazine is then ready for use without any further setting up or adjustments.

In the form shown the magazine is interchangeable with a type in wide use, with simpler structure and more automatic action. For compatibility with other types of magazines, the mechanism may vary in proportion and arrangement without losing any of the advantageous features.

Having described my invention, I now claim:

1. A microfilm magazine, comprising:
   a flat, substantially cylindrical casing having a closed side with an axially mounted film reel supporting shaft therein;
   a cover removably attached to the other side and seating thereon in light tight engagement;
   said cover having a clamp knob axially rotatably mounted thereon, with means for securement to said shaft;
   a corner block extending from a portion of the periphery to said casing, with mounting means thereon for attachment to a camera;
   a film exit opening in said mounting means with a movable light tight door biased to close the opening;
   and actuating means connected to said door, operable to open the door by attachment of the magazine to a camera.

2. A microfilm magazine according to claim 1, and including adjustable load means in said clamp knob for controlling the clamping pressure on said cover.

3. A microfilm magazine according to claim 2, wherein said shaft has a threaded end, said knob being axially threaded to engage said threaded end;
   said adjustable load means including an axially adjustable stop in said knob for engagement with said threaded end, and a load spring between said knob and said cover.

4. A microfilm magazine according to claim 1, and including a follower arm pivotally mounted at one end in said corner block, the other end of said arm having a roller biased to ride on the periphery of the film in the magazine, a footage indicator mounted on said casing and connected to said follower arm;
   a latch mounted in said casing for holding said follower arm against the side of the casing, said latch having a portion engageable by said cover to release the latch when the cover is secured.

5. A microfilm magazine according to claim 1, and including a mounting block secured on the closed side of said casing, said shaft extending through said closed side and being fixed in said mounting block;
   a sleeve rotatably mounted on said shaft and having a film reel supporting hub secured thereon.

6. A microfilm magazine according to claim 5, and including constant frictional drag means coupled between said sleeve and said casing.

7. A microfilm magazine according to claim 5, and including drive means connected to said sleeve, said drive means having a gear rotatable in said mounting block and positioned relative to said mounting means for engagement with the driving gear of a camera;
   said gear being resiliently supported for limited axial displacement substantially radially of said shaft.

8. A microfilm magazine according to claim 7, wherein said gear is rotatable on a pin held at one end in a portion of said mounting block, another portion of said block having a slot in which the other end of said pin is slidable, and a spring biasing said other end of the pin radially outwardly relative to said shaft.

9. A microfilm magazine according to claim 8, wherein said drive means comprises a pulley secured to said sleeve, a pulley on said pin and coupled to said gear, and a belt interconnecting said pulleys.

10. A microfilm magazine according to claim 9, and including an antibacklash torsion coupling between said gear and the connected pulley.

11. A microfilm magazine according to claim 1, and including latch means coupled to said door to hold the door open, said latch means having a release portion extending into said casing for engagement by said cover, to release said door when the cover is secured.

12. A microfilm magazine according to claim 1, and including a film reel supporting hub rotatably mounted on said shaft,
   drive means connected to said hub and including a gear for engagement with the driving gear of a camera, said gear being resiliently mounted to allow limited displacement of its axis during engagement with the driving gear.

* * * * *